(12) United States Patent
Zhang et al.

(10) Patent No.: US 7,437,162 B1
(45) Date of Patent: Oct. 14, 2008

(54) METHOD AND SYSTEM FOR DYNAMICALLY DELIVERING A VOICE CALL AS VOICE OR DATA DEPENDING ON DATA-MODE OF DESTINATION TERMINAL

(75) Inventors: Baoquan Zhang, Overland Park, KS (US); Thomas M. Sladek, Overland Park, KS (US); Charles E. Woodson, Peculiar, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1212 days.

(21) Appl. No.: 10/364,568

(22) Filed: Feb. 10, 2003

(51) Int. Cl.
*H04Q 7/20* (2006.01)

(52) U.S. Cl. .................. 455/445; 370/310; 370/352; 455/552.1

(58) Field of Classification Search .......... 370/354, 370/355, 310, 352; 455/445, 552.1
See application file for complete search history.

(56) References Cited

U.S. PATENT DOCUMENTS

| | | | |
|---|---|---|---|
| 5,335,276 A | 8/1994 | Thompson et al. | |
| 5,452,289 A | 9/1995 | Sharma et al. | |
| 5,453,986 A | 9/1995 | Davis et al. | |
| 5,533,019 A | 7/1996 | Jayapalan | |
| 5,564,077 A | 10/1996 | Obayashi et al. | |
| 5,594,782 A | 1/1997 | Zicker et al. | |
| 5,610,910 A | 3/1997 | Focsaneanu et al. | |
| 5,654,957 A | 8/1997 | Koyama | |
| 5,754,542 A | 5/1998 | Ault et al. | |
| 5,764,736 A | 6/1998 | Shachar et al. | |
| 5,777,991 A | 7/1998 | Adachi et al. | |
| 5,912,882 A | 6/1999 | Yafuso et al. | |
| 6,081,725 A * | 6/2000 | Ishida | 455/462 |
| 6,222,829 B1 * | 4/2001 | Karlsson et al. | 370/329 |
| 6,304,565 B1 * | 10/2001 | Ramamurthy | 370/352 |
| 6,317,607 B1 * | 11/2001 | Tomcik et al. | 455/552.1 |
| 6,389,010 B1 | 5/2002 | Kubler et al. | |
| 6,678,524 B1 * | 1/2004 | Hansson et al. | 455/445 |
| 6,704,305 B2 * | 3/2004 | Emerson, III | 370/352 |

(Continued)

FOREIGN PATENT DOCUMENTS

WO    WO 91/08629    6/1991

OTHER PUBLICATIONS

Swinehart et al., "Adding Voice to an Office Computer Network," Proceedings of the IEEE Globecom '83, Feb. 1984.

(Continued)

*Primary Examiner*—Fan Tsang
*Assistant Examiner*—Hemant Patel

(57) ABSTRACT

A method and system for dynamically delivering a voice call to a client station depending on whether the client station is currently in a mode in which it can receive data. A switch may receive a request to connect a voice call to a client station that the switch serves, and a determination may responsively be made as to whether the client station is in a mode in which it can receive data communications. If the determination is that it is not in the mode, then the switch may deliver the voice call to the client station by normal routing mechanics. On the other hand, if the determination is that it is in the mode, then the switch may re-direct the call to a circuit/packet gateway that may then extend the call as a voice-over-packet session to the client station.

12 Claims, 3 Drawing Sheets

U.S. PATENT DOCUMENTS

| | | | |
|---|---|---|---|
| 6,907,031 B1* | 6/2005 | Ehlinger et al. | 370/352 |
| 2001/0050907 A1* | 12/2001 | Madour et al. | 370/329 |
| 2002/0173327 A1* | 11/2002 | Rosen et al. | 455/518 |
| 2002/0194331 A1* | 12/2002 | Lewis et al. | 709/224 |
| 2003/0104813 A1* | 6/2003 | Julka et al. | 455/436 |
| 2003/0128676 A1* | 7/2003 | Lee | 370/328 |

OTHER PUBLICATIONS

Zellweger et al., "An Overview of the Etherphone System and Its Applications," Proceedings of the 2nd IEEE Conference on Computer Workstations, Mar. 1988.

Vin et al., "Multimedia Conferencing in the Etherphone Environment," IEEE Computer, vol. 24, No. 10, Oct. 1991.

Koyama et al., "Personal Multimedia Communication Systems," Hitachi Review, vol. 44, No. 4, Aug. 1995.

Qualcomm, "STU-III Service Option for Wideband Spread Spectrum Systems (Proposed Draft Text)," Version 3.05, Jun. 1995.

Palo Alto Research Center, "Etherphone: Collected Papers 1987-1988," May 1989.

* cited by examiner

METHOD AND SYSTEM FOR DYNAMICALLY DELIVERING A VOICE CALL AS VOICE OR DATA DEPENDING ON DATA-MODE OF DESTINATION TERMINAL

BACKGROUND

1. Field of the Invention

The present invention relates to network communications and, more particularly, to methods and systems for establishing voice communications. The invention is particularly useful in the context of delivering voice communications to a wireless voice/data terminal such as a 3G mobile phone for instance. However, aspects of the invention can be advantageously applied in other scenarios as well.

2. Description of Related Art

In certain communication systems, a client station may be precluded from engaging in both voice communication and data communication at once. This restriction occurs, by way of example, in some wireless communication systems.

For instance, a 3G mobile station (or, more generally, wireless terminal) may be capable of engaging in a traditional circuit-switched voice call and may also be capable of engaging in packet-data communications. However, in order to preserve air interface bandwidth or for other reasons, the network (and perhaps the mobile station itself) may be set to prevent the mobile station from concurrently having both (i) a radio link over which the mobile station would engage in a voice call and (ii) a radio link over which the mobile station would engage in packet-data communications. Therefore, while the mobile station is engaged in a voice call, the mobile may be unable to send or receive packet-data. And while the mobile station is actively engaged in a packet data session, the mobile station may be unable to place or receive a circuit-switched voice call.

SUMMARY

An exemplary embodiment of the present invention helps to overcome the foregoing restriction by leveraging of the well known fact that it is possible to transmit voice as packet data. In particular, the exemplary embodiment provides an intelligent system that dynamically delivers a voice call to a given client station as either voice or data, depending on whether the client station is currently in a mode in which it can receive data, and perhaps depending further on subscriber service parameters.

In accordance with the exemplary embodiment, when a network receives a request to terminate a voice call to a client station, the network will determine whether the client station is currently in a mode in which it can communicate packet data. If the client station is not in that mode, then the network will deliver (or attempt to deliver) the call to the client station as a normal voice call. On the other hand, if the client station is in that mode, then, possibly depending on additional logic such as subscriber service parameters, the network will programmatically pass the call to a circuit/packet gateway function that will in turn deliver the call to the client station as packet data, such as voice-over-IP (VoIP) for instance.

By way of example, a switch in the network may receive a call-setup request message, seeking to connect a call to a designated terminal. While processing the request, the switch may encounter an advanced intelligent network (AIN) trigger that causes the switch to signal to a central controller such as a service control point (SCP) for guidance. The central controller may then query a network entity or data store to determine whether the destination terminal is in a mode in which it can communicate packet-data.

If the central controller determines that the terminal is not in a mode in which it can receive packet data, then the central controller may direct the switch to deliver the call to the circuit station according to default routing procedures. Thus, the switch may responsively ring the client station, and if and when the client station goes off hook, the switch may connect the call to the client station as a normal voice call.

On the other hand, if the central controller determines that the terminal is in a mode in which it can receive packet data, then the central controller may direct the switch to route the call to a circuit/packet gateway. The switch may then responsively route the voice call to the circuit/packet gateway, and the gateway may set up a voice-over-packet session with the client station and extend the voice call to the client station via the voice-over-packet session.

These as well as other aspects and advantages of the exemplary embodiment will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION OF THE EXEMPLARY EMBODIMENT

1. Overview

Figure 1:
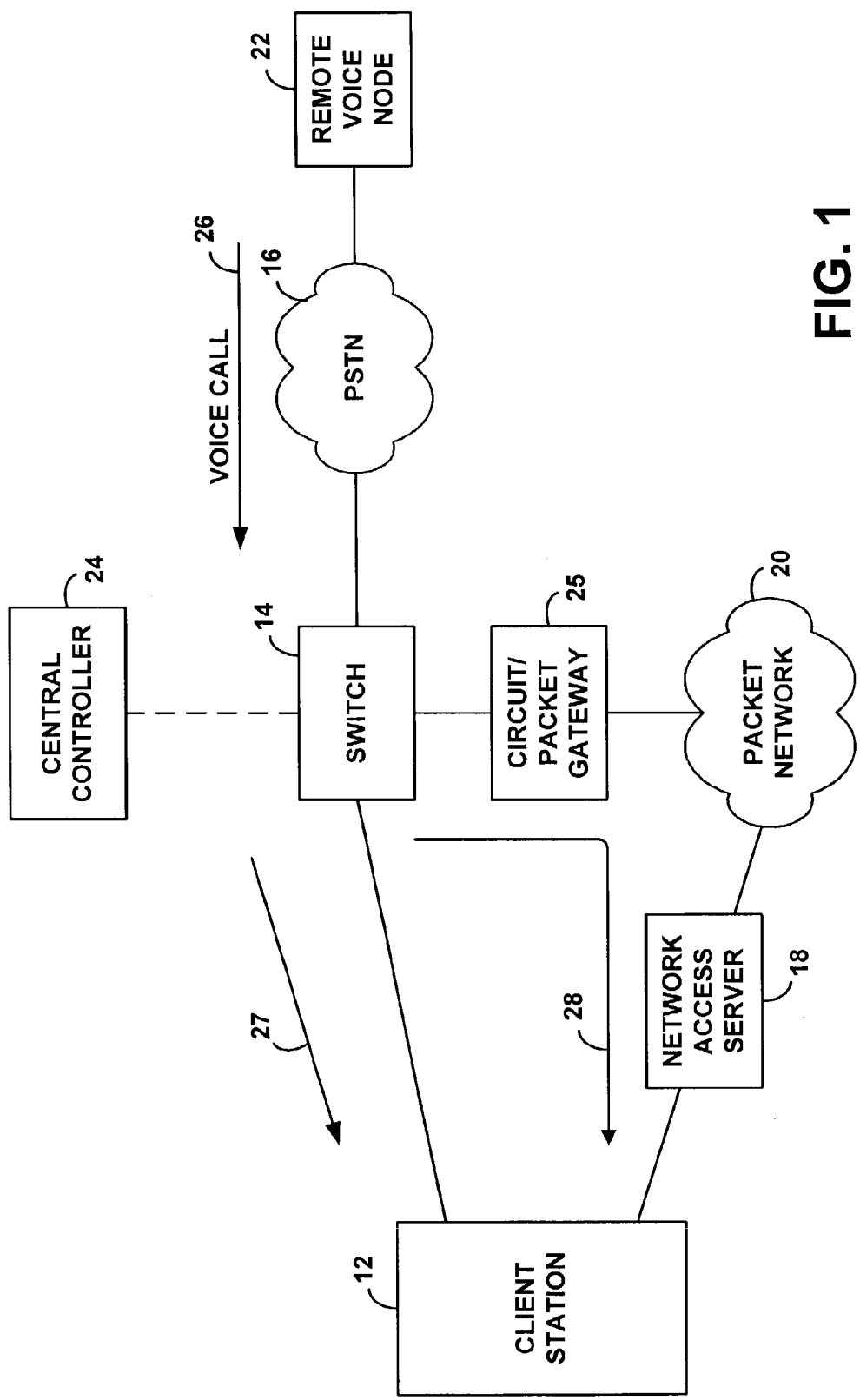
FIG. 1 is a block diagram of system that can operate in accordance with the exemplary embodiment.

Referring to the drawings, FIG. 1 is a simplified block diagram of a system that can operate according to an exemplary embodiment of the present invention. The system of FIG. 1 includes a client station 12, a switch 14, a legacy telephone network (e.g., public switched telephone network (PSTN)) 16, a network access server (NAS) 18, a packet-switched network (e.g., the Internet) 20, a remote voice node 22, a central controller (or "central control point") 24 and a circuit/packet gateway 25. FIG. 1 further depicts, by arrows, a voice call 26 that arrives from remote voice node 22 to switch 14 and two different paths 27, 28 over which the voice call might be delivered from the switch 14 to the client station.

It should be understood, however, that this and other arrangements and processes described herein are set forth for purposes of example only, and other arrangements and elements (e.g., machines, interfaces, functions, orders of elements, etc.) can be added or used instead and some elements may be omitted altogether. Further, as in most telecommunications applications, those skilled in the art will appreciate that many of the elements described herein are functional entities that may be implemented as discrete components or in conjunction with other components, in any suitable combination and location.

For example, although FIG. 1 shows switch 14 and gateway 25 as separate entities, it is possible that the two entities could be combined together on a single platform (e.g., with circuit/packet gateway 25 as a function of switch 14). Similarly, although FIG. 1 shows separate links connecting client station 12 to switch 14 and NAS 18, a single physical link might connect the client station to the switch 12, and the switch 12 may then connect with the NAS 18. Other variations are possible as well.

Still further, various functions described herein as being performed by one or more entities may be carried out by a processor executing an appropriate set of machine language instructions stored in memory. Provided with the present disclosure, those skilled in the art can readily prepare appropriate computer instructions to perform such functions. Alternatively or additionally, various functions described could be carried out by firmware and/or hardware.

Generally speaking, in the arrangement of FIG. 1, client station 12 is capable of receiving voice calls over the legacy telephone network, via switch 14. In this regard, switch 14 may receive a voice call initiation message indicating that remote voice node 22 is seeking to place a voice call to client station 14. Switch 14 may then responsively alert client station 12, such as by sending a page or ring signal to the client station. When client station 12 goes off hook, switch 14 may then connect the call to the client station over path 27. A user of the client station 12 may then speak with a user of the remote voice node (or with the remote voice node itself).

Further, client station 12 is also capable of receiving data communications, typically as a sequence of packets such as IP packets for instance. These packets may come from packet-switched network 20 to NAS 18, and NAS 18 may deliver them over a point-to-point data link to the client station 12. Alternatively, switch 14 may direct an incoming call to gateway 25, and gateway 25 may set up a voice-over-packet session with client station 12 and extend the call to the client station 12 in the voice-over-packet session, so that the voice flows over path 28. A user of the client station 12 may then similarly speak with a user of the remote voice node.

Figure 2:
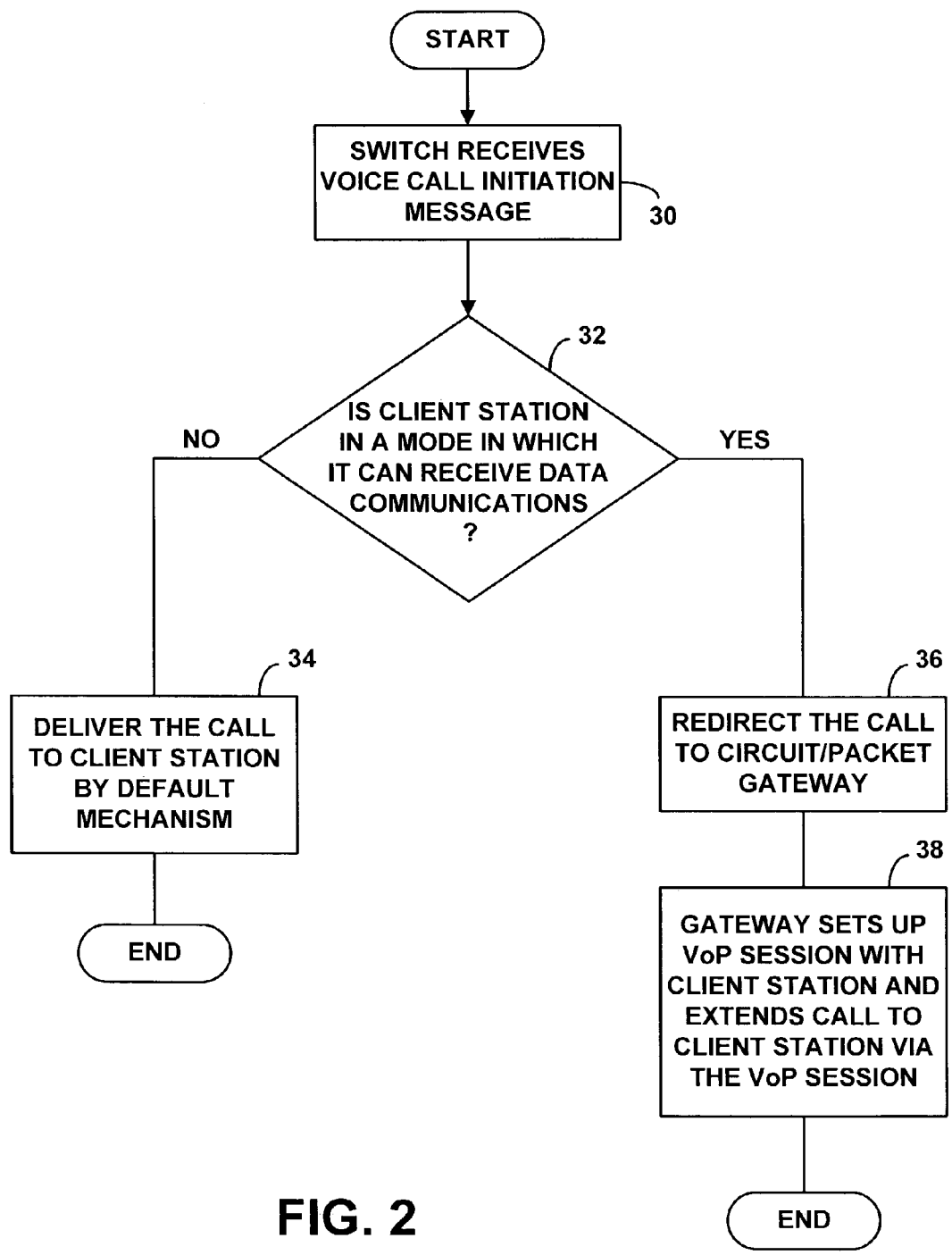
FIG. 2 is a flow chart depicting exemplary functions carried out within the system of FIG. 1.

FIG. 2 is a flow chart depicting operation of the exemplary embodiment, within the exemplary arrangement shown in FIG. 1. As shown in FIG. 2, at block 30, switch 14 receives a voice call initiation message indicating that remote voice node 22 is seeking to place a voice call to client station 12.

In a default mode of operation, switch 14 may normally route such a call over path 27 to the client station. In particular, the switch 14 may send a page or ring signal to the client station and wait for the client station to go offhook. Once the client station goes offhook, the switch 14 may then connect the voice call over link 27 to the client station.

According to the exemplary method, this default mode of operation may or may not apply in a given instance. In particular, depending on whether the client station is in a mode in which it can receive data communications, the switch may instead re-direct the voice call to gateway 25, and gateway 25 may set up a voice-over-packet session with client station 12 and extend the call through that voice-over-packet session to the client station Thus, as further shown in FIG. 2, at block 32, a determination is made as to whether the client station 12 is in a mode in which it can receive data traffic. This determination can be made by the switch 14 itself or by some other entity such as central controller 24, and the determination can be made by consulting state records for the client station, or in some other way. For instance, switch 14 may signal to central controller 24, and central controller 24 may make the determination and then respond to the switch with a suitable result or directive.

If the determination is that the client station is not in a mode in which it can receive data traffic, then, at block 34, the switch 14 may route the call to the client station by default as described above (i.e., as a "circuit-terminated call" or a "voice-over-circuit call"). On the other hand, if the determination is that the client station is in a mode in which it can receive data traffic, then, at block 36, the switch 14 may redirect the call to gateway 25, and, at block 37, gateway 25 may set up a voice-over-packet session with the client station and extend the voice call to the client station via that session as described above.

In some instances, the decision to deliver a voice call as voice-over-packet (via path 28), rather than by default as a legacy voice call (via path 27), could be based on a service profile for the client station (or user) or on other factors. For example, central controller 24 could maintain a profile record for the client station and, upon signaling from the switch 14, could programmatically refer to that record to determine whether the client station is a candidate for the alternative routing.

Further, a determination could be made that the client station is in mode in which (by policy or other constraints) the client station cannot receive a voice call by the default routing mechanism (via path 27). (By way of example, this might be the case if the client station has an active data session and is precluded from engaging in a voice call while engaged in the data session.) In response, the switch may then similarly route the call to the gateway 25 to be extended as a voice-over-packet session to the client station.

In the arrangement of FIG. 1, client station 12 could be a single device or a set of devices. Further, it could be, or could include, landline and/or wireless equipment, and the remainder of the system could be arranged accordingly.

2. Example Wireless Arrangement

Figure 3:
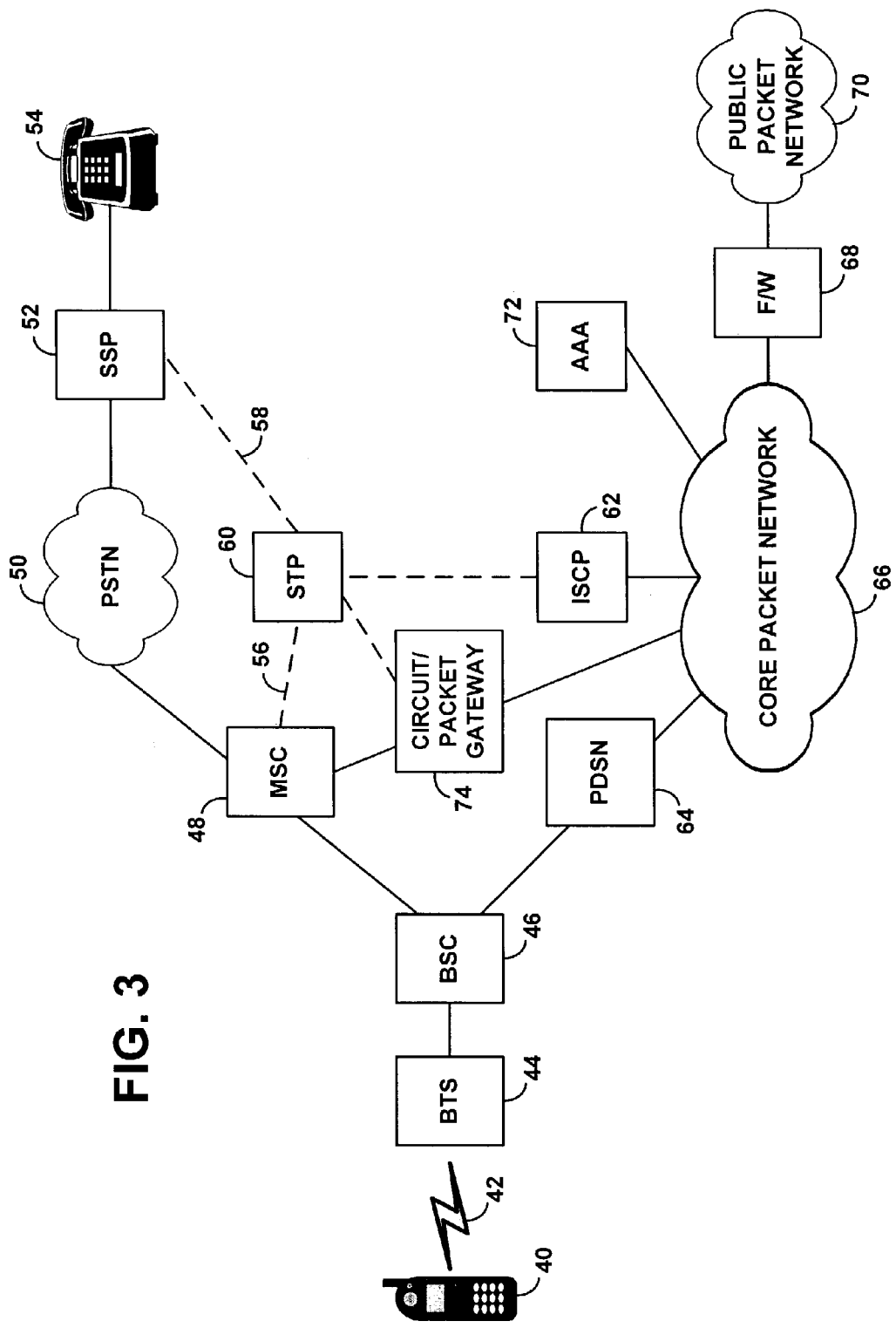
FIG. 3 is a block diagram of a wireless communication that can operate in accordance with the exemplary embodiment.

In a wireless arrangement, by way of example, client station 12 could be a wireless terminal, such as a 3G or later mobile station, that is capable of engaging in both legacy wireless voice calls and next generation packet data communications. Switch 14 may then comprise a mobile switching center (MSC), and central controller 24 may be an integrated service control point (ISCP) of the type made by Telcordia Technologies, for instance. FIG. 3 is a simplified block diagram of an exemplary wireless communication system arranged in this manner.

As shown in FIG. 3, the exemplary system includes a mobile station (MS) 40 that can communicate over an air interface 42 with a base transceiver station (BTS) 44. (For purposes of this description, the air interface can be assumed to be a cdma2000 interface, operating according to TIA/EIA IS-2000 and revisions thereof; but other air interface protocols could be used instead, with any accompanying adjustments in the remainder of the network architecture.) The BTS 44 is then coupled with a base station controller (BSC) 46, which serves to assign air interface traffic channels for use by mobile stations such as MS 40 to wirelessly communicate with BTS 44.

a. Legacy Voice Calls

To facilitate circuit-switched voice calls, BSC 46 is coupled with an MSC 48, which provides connectivity with the PSTN 50. (By comparison to the arrangement of FIG. 1, the combination of BSC 46 and MSC 48 might constitute switch 12.) For purposes of example, a landline switch (e.g., service switching point (SSP)) 52 is also shown coupled with the PSTN 50 and serving a remote landline telephone 54. Further, both the MSC 48 and SSP 52 are shown coupled by signaling links (dashed lines) 56, 58 with a signaling system represented by a signal transfer point (STP) 60. And the signaling system connects with an ISCP 62.

In this arrangement, a user of remote telephone 54 could place a call to MS 40, in which case SSP 52 might send an ISUP IAM message via STP 60 to MSC 48. By default, MSC 48 would then signal to BSC 46, and BSC 46 would send a page message (via BTS 44) over the air to MS 40 and would assign an air interface traffic channel (radio link) for MS 40 to use for the call. When a user of MS 40 answers the call, MSC 48 would then connect the call to MS 40. Voice communication between telephone 54 and MS 40 may then proceed conventionally.

b. Packet-Data Communications

As further shown in FIG. 3, BSC 46 is also coupled with a packet data serving node (PDSN) 64, which is a type of network access server, typically configured and optimized for wireless packet data communications. The PDSN 56 provides connectivity with a packet network 66, shown by way of example as a wireless carrier's core packet network, and the packet network 66 may then be linked though a firewall 68 to another packet network 70, such as the Internet for instance. These packet networks may be combined into one or distributed in some other way if desired.

To allow the wireless carrier to account for subscriber data communications, an authentication, authorization and accounting (AAA) server 72 may also sit on the core packet network 66 and may receive and store user-data-records (UDRs) of various types from the PDSN 64 in a manner well known to those skilled in the art.

In this example arrangement, MS 40 may (automatically or at user request) signal to BSC 46 over an air interface access channel, to request a traffic channel for use in engaging in packet data communications. And BSC 46 may responsively assign a traffic channel for use by the MS. Further, if MS 40 does not yet have a data link with PDSN 64, MS 40 may then send a mobile-IP registration message to the PDSN. In response, the PDSN may assign an IP address to the MS and will establish a point-to-point protocol (PPP) data session with the MS. Further, the PDSN may send a UDR to the AAA server, indicating that MS 40 has acquired a data link and an active radio link, and the AAA server may record that information for later reference.

When a mobile station such as MS 40 has a radio link and a data link, it is considered to be in an active mode for data communications. In that mode, the MS 40 can engage in IP communications with other entities on packet network 70, by sending and receiving packet data over its radio link and data link.

In a typical arrangement, however, the radio link that BSC 46 assigns to MS 40 will time out after a certain period of non-use (or will be released for other reasons), while the data link between MS 40 and PDSN 64 may still remain so that the MS still has an IP address. In that case, the MS 40 is considered to be in a dormant mode for data communications. By industry standards (e.g., TIA/EIA IS-85), when a mobile station such as MS 40 switches from an active mode to a dormant mode, a packet control function (PCF, not shown) on the BSC 46 may send an "active stop air link" record to the PDSN 64. And the PDSN 64 may then send a UDR to the AAA server, indicating that the MS 40 has switched to a dormant mode.

In the dormant mode, when packet data arrives at the BSC 46 for transmission to the IP address of the MS 40, the BSC 46 may page the MS over the air, and the MS may then request a traffic channel over which to receive the incoming packet data. The BSC may then assign a traffic channel, re-establishing a radio link, and thereby transitioning the MS from a dormant mode to active mode. In this case, the PCF on the BSC 46 may send an "active start air link" record to the PDSN 64, and the PDSN 64 may send a UDR to the AAA server, indicating that the MS 40 has switched to an active mode.

Normally, a data link may time out after a certain time period, which is preferably longer than the active-to-dormant timeout period. This time period may be established by default or by a timer field value in the mobile station's mobile-IP registration message.

MS 40 may also discontinue a data session (automatically or at user request), by sending a new mobile-IP registration message with timer value set to zero. In response, the PDSN 64 would immediately release the data link, and the PDSN 64 would send a UDR to the AAA server, indicating that the MS no longer has a data link.

In the exemplary embodiment, the MS 40 is able to engage in voice-over-packet communications. To set up a voice-over-packet session, for instance, MS 40 may receive a session initiation protocol (SIP) INVITE request, that seeks to establish a voice-over-packet session and MS 40 may apply a SIP application to respond to the request and agree to engage in the session. The MS may then receive an incoming stream of packets, may uncover digitized voice from the packets and may play out the voice to a user. Conversely, the MS may receive voice from the user, may digitize and packetize the voice, and may send an outgoing stream of packets.

c. Circuit/Packet Translation

In accordance with the exemplary embodiment, when MSC 48 receives a voice call initiation message that seeks to establish a call from telephone 54 to MS 40, a determination may be made that MS 40 has a data link (active or dormant), and the MSC 48 may responsively route the call to a gateway that will then deliver the call to MS 40 as a voice-over-packet session. For this purpose, the system of FIG. 3 may further include a circuit/packet gateway function ("gateway") 74.

Gateway 74 may be coupled with MSC 48 (as shown in FIG. 3) or may be integrated as a function of MSC 48. Further, gateway 74 may be linked with the signaling system that includes STP 60.

In the exemplary embodiment, gateway 74 may comprise a media gateway that is capable of translating between legacy voice traffic (e.g., TDM/PCM traffic) and voice-over-packet traffic. Thus, like MS 40 as described above, gateway 74 may include logic to be able to receive a voice signal, packetize the signal, and output a representative stream of packets, and gateway 74 may also include logic to be able to receive an incoming packet stream, depacketize and reassemble an underlying voice signal, and output the voice signal. This sort of logic is conventional in a media gateway and is therefore not described here in detail.

Further, gateway 74 may also comprise a media gateway controller (MGC) that is conventionally capable of translating between legacy call signaling (such as ISUP messages) and next generation call signaling (such as SIP). For instance, the MGC may include logic (i) to receive an ISUP IAM that seeks to set up a call to a particular telephone number (as indicated by an Original Called party Number (OCN) or Re-Directing Number (RDN) field) and (ii) to translate that IAM into a SIP INVITE to an SIP address corresponding to that telephone number. Further, the MGC may include logic to translate subsequent signaling messages between ISUP and SIP (or between other applicable protocols).

Thus, when MSC 48 receives an ISUP IAM seeking to establish a voice call to the directory number of MS 40, if a determination is made that the call should be delivered as voice-over-packet rather than by the default mechanism, MSC 48 may itself send an ISUP IAM (via the signaling system) to gateway 74. Gateway 74 may then look up a SIP address corresponding to the directory number of MS 40 and may generate and send a SIP INVITE to that SIP address, seeking to set up a voice-over-IP session with the client station. A proxy server may route that SIP INVITE to the IP address currently assigned to MS 40, so the SIP INVITE would pass via PDSN 64 to the MS. In turn, a SIP application on MS 40 may respond affirmatively with a SIP 200 OK message, and, after an acknowledgement by gateway 74, the gateway would extend the call to the MS as voice-over-IP.

d. Decision Logic

As noted above, the switch that receives the voice call initiation message may itself determine whether to route the call conventionally as a circuit-switched call to the client station, or whether to instead to re-direct the call to a circuit/packet gateway that will extend the call to the client station as a voice-over-packet call. Alternatively, another entity such as a central controller may make that determination. Still further, a combination of entities could work together to make the determination.

By way of example, in FIG. 3, ISCP 62 may function to make the determination, by querying the AAA server 72. In particular, when MSC 48 receives an ISUP IAM seeking to establish a voice call from telephone 54 to MS 40, MSC 48 may encounter an AIN trigger (or, more particularly, a wireless intelligent network (WIN) advanced termination trigger) that causes MSC 48 to send an AnalyzedInfo message via STP 60 to ISCP 62. The AnalyzedInfo would carry the directory number of MS 40, as indicated in the IAM received by MSC 48.

In the exemplary embodiment, ISCP 62 will have a communication link with the AAA server 72. For instance, ISCP 62 may be coupled to the carrier's core packet network 62, so that it can communicate with the AAA server via that network.

When the ISCP 62 receives the AnalyzedInfo, it may refer to a subscriber profile record (not shown) for MS 40 to determine that MS 40 subscribes to the present dynamic routing service. ISCP 62 may then send a query message in a predefined format to the AAA server 72, seeking to determine the data-mode of MS 40, and providing the AAA server 72 with the directory number of MS 40.

The AAA server, in turn, may be programmed with logic (e.g., a suitable software application) that causes it to respond to the query message from the ISCP 62 by determining the latest state of MS 40 as indicated by the UDRs that it has received from the PDSN 64. Thus, for instance, the state of the MS might be (i) no data link, (ii) data link and active or (iii) data link and dormant. The AAA server 72 may then report that state of MS 40 in a response message to the querying ISCP.

(Note that, in an alternative embodiment, the ISCP or other entity seeking to determine the data mode of an MS or other client station could instead query another network entity that maintains or has access to such state information. Examples include, without limitation, a network access server such as PDSN 64 and a presence server (not shown) that tracks online status of client stations. Still alternatively, the ISCP may regularly poll an entity such as the AAA server for updates of client status, and so the ISCP may itself have a data compilation to which it can refer to determine the current (or relatively current) state of a client station such as MS 40.)

In turn, the ISCP may apply logic that decides what action to take in response to the current state of MS 40. By way of example, the logic might indicate as follows: (1) if the MS has no data link, then apply default routing, (2) if the MS has a data link and is active, then redirect the call to circuit/packet gateway 74 to be extended to the MS as voice-over-packet, and (3) if the MS has a data link and is dormant, then take action 1 or 2 depending on a designation in the MS profile record. (The subscriber profile record for MS 40 may then indicate which sort of routing is preferred in the scenario where either type would be permissible/possible.)

The ISCP 62 may then send an analyzedinfo response message to the MSC 48, indicating what action to take, and the MSC 48 may proceed accordingly. In particular, if the action is to apply default routing, then the MSC 48 may simply proceed as normal, directing BSC 46 to page MS 40 and connecting the call when MS 40 goes off hook. Alternatively, if the action is to redirect the call to gateway 74, then the MSC 48 may send an ISUP IAM to gateway 74 and gateway may extend the call to the MS 40 as a voice-over-IP session.

3. Example Landline Arrangement

A similar scenario can apply as well in a landline system. In an exemplary landline system, the client station 12 of FIG. 1 could comprise a combination of a legacy telephone and a multimedia personal computer, both of which may be tied to a common telephone line and would therefore share a common telephone number. The telephone may place and receive voice calls conventionally via the telephone line, and the computer may engage in a dial-up data session, via the telephone line, through NAS 18.

Switch 14 may then be a telephone company's central office switch (typically an SSP) that serves the telephone line. And switch 14 may have a connection with the NAS 18, so that switch 14 can connect dial-up data calls from client station 12 to NAS 18, to provide packet-network connectivity. Further, gateway 25 may comprise a media gateway and a media gateway controller as described in the above wireless arrangement.

In such a landline arrangement, the legacy telephone would be unable to receive calls over the telephone line if the computer currently has a dial-up data link with the NAS 18, via switch 14. Similarly, the computer would be unable to acquire a dial-up data link with NAS 18 or to receive data from the NAS 18 if the telephone is currently using the telephone line for a voice call. (Digital subscriber line (DSL) systems are an exception.)

In this scenario, according to the exemplary embodiment, the switch may receive a voice call initiation message seeking to set up a voice call to the telephone number of the client station. In response, the switch may determine a current data mode of the client station. In this example, the switch might make that determination itself, since it is the switch that would have connected the client station to NAS 18.

Thus, if the client station is currently connected to the NAS 18 via switch 12, then the switch may programmatically conclude that the client station has a data link over which the client station could receive voice-over-packet communications. In that case, the switch could responsively redirect the call to gateway 25, which could then programmatically extend the call to the client station as a voice-over-packet session.

On the other hand, if the client station is not connected to the NAS 18, then the switch may programmatically conclude that the client station does not have a data link over which the client station could receive voice-over-packet communications. In that case, the switch could route the call directly to the client station by the normal mechanism, over path 27.

CONCLUSION

An exemplary embodiment has been described above. Those of ordinary skill in the art will appreciate, however, that many variations on the embodiment described are possible, while remaining within the true scope and spirit of the claimed invention.

We claim:

1. A voice call delivery method comprising:
receiving a request to connect a voice call to a client station, wherein the client station is in a mode selected from a group consisting of (i) the client station not being on a data call, (ii), the client station being on an active data call, and (iii) the client station being on a dormant data call, and wherein a designation of the client station's preferred type of call is stored in a profile associated with the client station;
in response to the request, querying an authentication, authorization and accounting (AAA) server;
receiving, from the AAA server, the mode of the client station as indicated by user data records (UDRs) stored in the AAA server and associated with the client station;
if the mode of the client station is that the client station is not on a data call, then delivering the voice call to the client station as circuit voice;
if the mode of the client station is that the client station is on an active data call, then delivering the voice call to the client station as voice over packet; and
if the mode of the client station is that the client station is on a dormant data call, then delivering the voice call to the client station as either circuit voice or voice over packet as indicated by the designation of the client station's preferred type of call.

2. The method of claim 1, wherein the client station comprises a wireless terminal that receives the voice call over a wireless air interface.

3. The method of claim 1, wherein receiving a request to connect a voice call to the client station comprises receiving a voice call initiation request designating a telephone number of the client station.

4. The method of claim 1, wherein receiving a request to connect a voice call to the client station comprises receiving the request at a network switch that serves the client station.

5. The method of claim 4, wherein the switch comprises an entity selected from the group consisting of a service switching point and a mobile switching center.

6. The method of claim 4, wherein delivering the voice call to the client station as voice over packet comprises:
redirecting the voice call to a gateway, wherein the gateway translates between circuit voice traffic and voice-over-packet traffic; and
the gateway extending the voice call to the client station as a voice-over-packet session.

7. A voice call delivery method comprising:
receiving a request to connect a voice call to a client station, wherein a designation of a type of call preferred by the client station is stored in a profile associated with the client station;
in response to the request, querying an authentication, authorization, and accounting server to make a first determination of whether the client station is in a mode in which the client station can receive packet data communications;
if the first determination is that the client station is not on a data call, then delivering the voice call as circuit voice to the client station; and
if the first determination is that the client station is on a data call, then:
(i) making a second determination of whether the client station is on a dormant or active data call
(ii) if the client station is on an active data call, then delivering the voice call as voice over packet; and
(iii) if the client station is on a dormant data call, then delivering the voice call to the client station as circuit voice or voice over packet according to the client station's designated preferred type of call.

8. A voice call delivery system comprising:
a switch arranged to receive a request to connect a voice call to a client station, wherein the client station is in a mode selected from a group consisting of (i) the client station not being on a data call, (ii), the client station being on an active data call, and (iii) the client station being on a dormant data call, and wherein a designation of the client station's preferred type of call is stored in a profile associated with the client station;
means, responsive to the request, for querying an authentication, authorization and accounting (AAA) server;
means for receiving, from the AAA server, the mode of the client station as indicated by user data records (UDRs) stored in the AAA server and associated with the client station;
wherein, if the mode of the client station is that the client station is not on a data call, then delivering the voice call to the client station as voice;
wherein, if the mode of the client station is that the client station is on an active data call, then delivering the voice call to the client station as a voice-over-packet session; and
wherein, if the mode of the client station is that the client station is on a dormant data call, then delivering the voice call to the client station as either voice or a voice over packet session, as indicated by the designation of the client station's preferred type of call is stored in a profile associated with the client station.

9. The system of claim 8, wherein the client station comprises a wireless terminal that receives the voice call over a wireless air interface.

10. The system of claim 8, wherein the switch comprises an entity selected from the group consisting of a service switching point and a mobile switching center.

11. A voice call routing system comprising:
a client station, wherein the client station is in a mode selected from a group consisting of (i) the client station not being on a data call, (ii) the client station being on an active data call, and (iii) the client station being on a dormant data call;
an authentication, authorization and accounting (AAA) server containing user data records (UDRs) associated with the client station that indicate the mode of the client station;
a switch, further comprising:
a processor;
data storage;
a client profile containing a designation of a type of call preferred by the client station, wherein the client profile is stored in the data storage; and
machine language instructions stored in the data storage and executable by the processor to make a determination of the mode of the client station and deliver the voice call to the client station, wherein (i) if the mode of the client station is that the client station is not on a data call, then delivering the voice call to the client station as voice, (ii) if the mode of the client station is that the client station is on an active data call, then delivering the voice call to the client station as voice over packet; and (iii) if the mode of the client station is that the client station is on a dormant data call, then delivering the voice call to the client station as either circuit voice or voice over packet as indicated by the designation in the client station's profile.

12. The method of claim 1 wherein the mode of the client station is determined in part from information in UDRs sent from a packet control function (PCF).

* * * * *